United States Patent Office 2,734,622
Patented Feb. 14, 1956

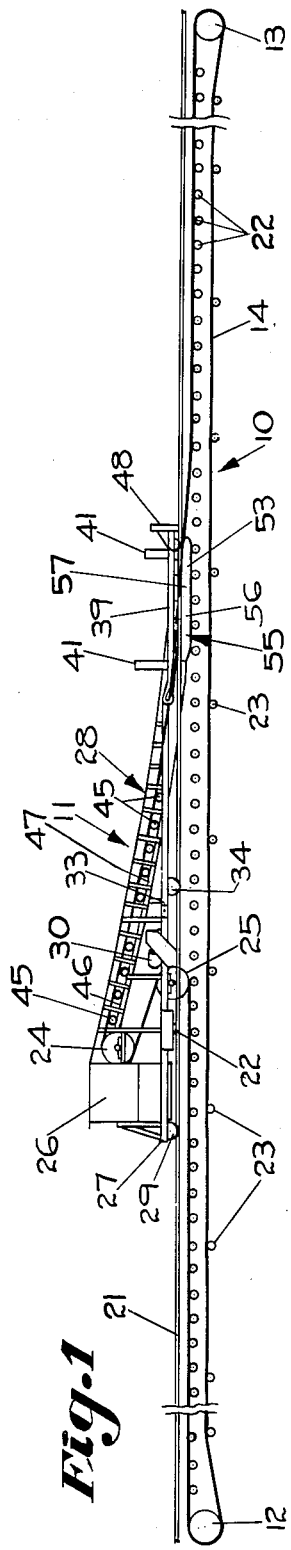

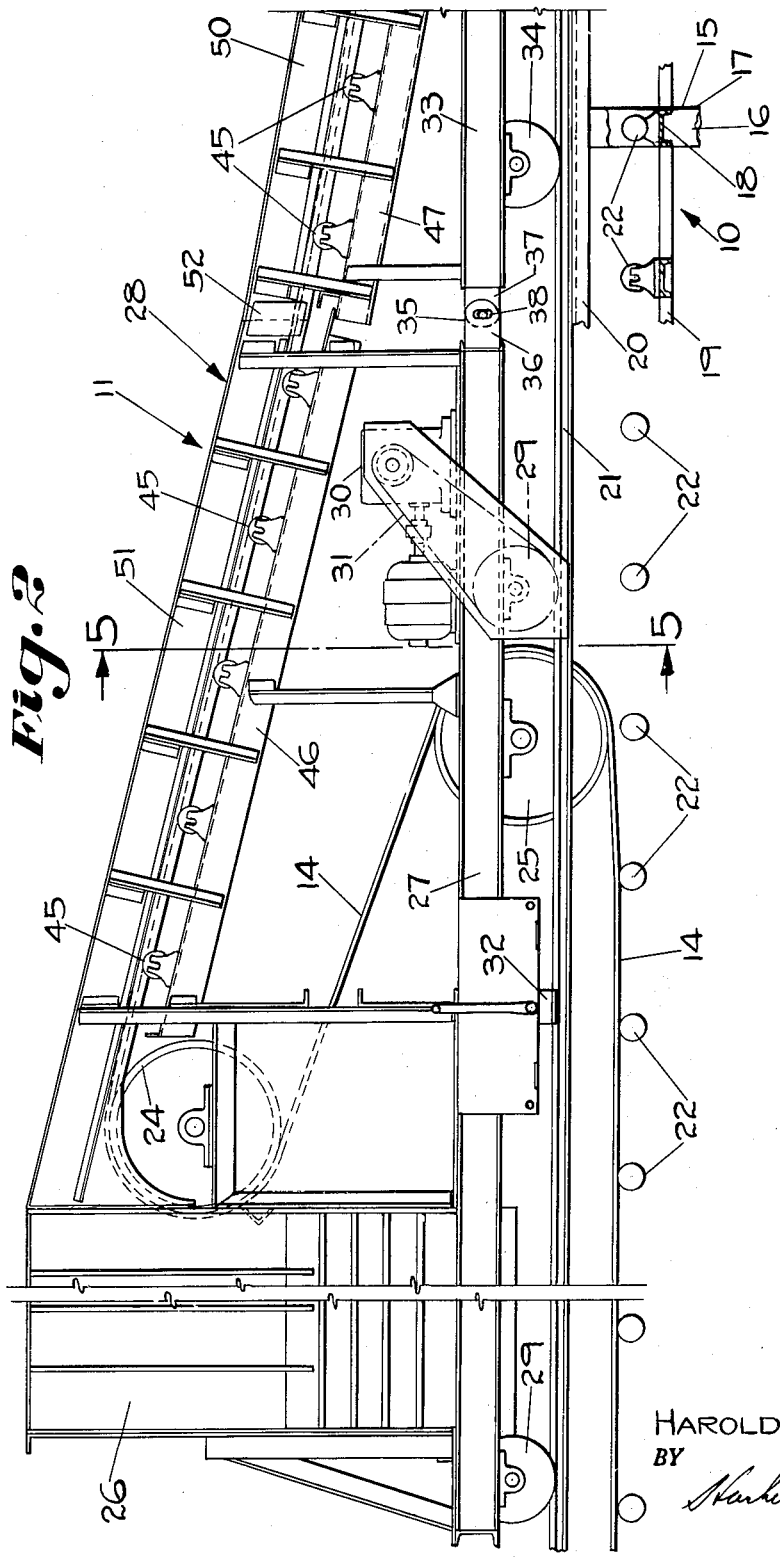

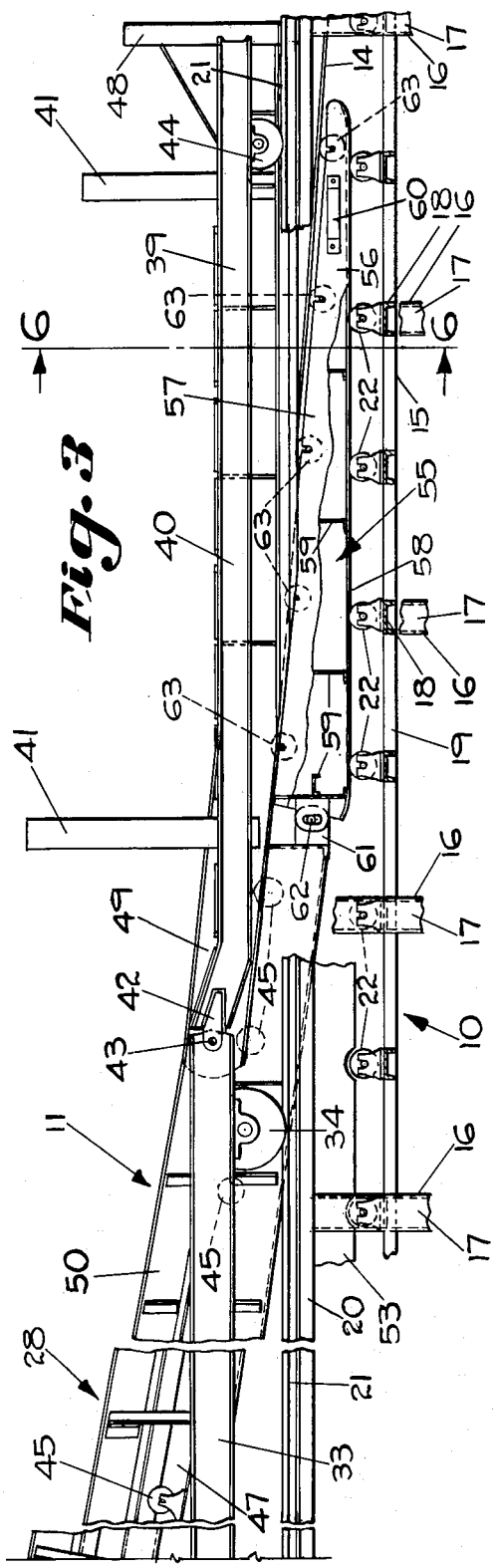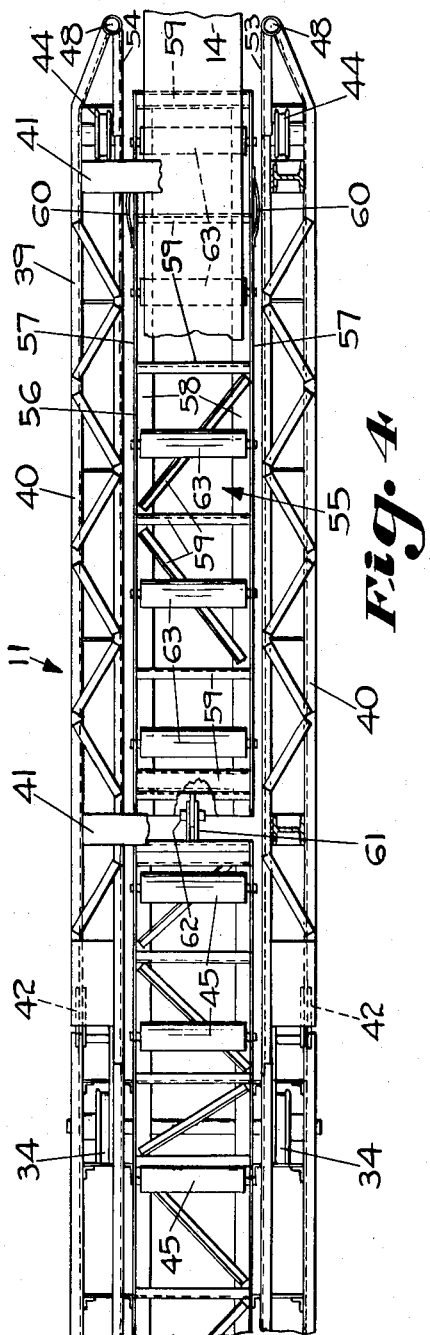

2,734,622

CONVEYING APPARATUS, INCLUDING A BODILY MOVABLE BELT SUPPORTING TRANSFER MEANS

Harold S. Everhart, Columbus, Ohio, assignor to The Jeffrey Manufacturing Company, a corporation of Ohio Application April 6, 1953, Serial No. 346,858

12 Claims. (Cl. 198—186)

This invention relates to conveyer apparatuses of the type that include trippers and the like wherein there is a movable means including a frame that may travel along a conveyer mechanism therebelow to discharge material, for example, from an endless belt conveyer that travels over both of said frames.

An object of the invention is to provide an improved conveyer of the type set forth above wherein there is a support means for supporting an endless belt conveyer during its travel between the movable means and the conveyer mechanism therebelow.

Another and more specific object of the invention is to provide improved apparatus including a frame adapted to travel along the frame of a main conveyer and which, for example, may discharge material from an endless belt conveyer that travels over or through both of said frames and which may include or have attached thereto a means adapted to follow the movements of the discharging apparatus along the main conveyer as well as the changes in elevation of the conveyer supporting means therebelow and which is adapted to support the endless belt conveyer between the main conveyer and the movable frame.

Still another object of the invention is to provide an improved conveyer apparatus of the type wherein there is a main conveyer including a frame and a movable apparatus that may travel along the main frame for discharging material, for example, from an endless belt conveyer that travels over or through both the main conveyer frame and the frame of the movable apparatus and wherein there is a means that follows movements of the movable discharge apparatus frame and is carried by the support means for the endless conveyer on the main frame and follows changes in elevation of said support means and which is adapted to support the endless belt conveyer between the movable discharge apparatus frame and said support means on the main frame.

Other objects of the invention will appear hereinafter, the novel features and combinations being set forth in the appended claims.

In the accompanying drawings:

Fig. 1 is a more or less diagrammatic side view in elevation of a tripper conveyer apparatus that embodies the invention;

Figs. 2 and 3, placed end to end, constitute a side view in elevation, with parts broken away, of that portion of the conveyer apparatus seen in Fig. 1 that embodies the invention;

Fig. 4 is a view in plan, with parts broken away, of a portion of the mechanism seen in Fig. 3;

Fig. 5 is a view in section, the section being taken on line 5—5 of Fig. 2; and

Fig. 6 is a view in section, the section being taken on line 6—6 of Fig. 3.

In Fig. 1 of the drawings there is shown, more or less diagrammatically, a conveyer apparatus for logs and the like that embodies the invention. This conveyer apparatus includes a main conveyer 10 along which a tripper apparatus 11 travels which may discharge logs from the conveyer apparatus at any desired position along its length.

The basic construction of the main conveyer 10 is generally typical of such tripper conveyers. It includes a power driven head pulley 12, a tail pulley 13 and an endless belt conveyer 14 that is reeved over said head pulley 12 and tail pulley 13 and travels between them. The main frame 15 of main conveyer 10 includes a plurality of spaced generally rectangular upright stands or chairs 16 that include spaced side channel members 17 interconnected by upper and lower cross channels 18, only the upper of which are shown in the drawings. The stands or chairs 16 are spaced apart and interconnected adjacent their tops by spaced horizontal stringer members 19, the tops of which are aligned with the tops of cross channels 18 and welded thereto. The upper ends of the upright side members 17 of stands or chairs 16 on each side of the main frame 15 carry an inverted channel member 20 extends longitudinally substantially throughout the length of main frame 15. Channel members 20 carry rails 21 along which the wheels of the tripper apparatus roll as the tripper apparatus traverses the main conveyer 10 longitudinally.

Spaced between the head pulley 12 and the tail pulley 13 is a plurality of idler rollers 22 that extend transversely of the main frame 15 and which are carried by suitable brackets mounted on the stringer members 19 and upper channels 18 of the chairs 16. Idler rollers 22 support or carry the upper or working run of the endless belt conveyer 14, and a plurality of idler rollers 23 spaced below the idler rollers 22 support the endless belt conveyer in its lower or non-working run. It is to be understood that the main frame 15 may include bracing and other members which are not pertinent to the present invention and which therefore are not shown or described herein.

As is obvious from Fig. 1 of the drawings the tripper apparatus 11 includes two pulleys 24 and 25 over which the endless belt conveyer 14 bends as it travels from the tail pulley 13 to the head pulley 12, and logs and the like, being conveyed upon the belt 14, are discharged over the pulley 24 into a chute 26 from which they are discharged from the conveyer apparatus. Pulleys 24 and 25 and the chute 26 are carried by the head section frame 27 of a three-section tripper apparatus main frame 28 (see Figs. 2 and 3) that is carried upon flanged wheels that roll along the rails 21. The head section frame 27 which carries the pulleys 24 and 25 and chute 26 is supported upon two pairs of spaced wheels 29, and one pair of these wheels 29 is power driven in reverse directions by an electric motor and speed reducing gear mechanism 30 through a suitable chain and sprocket drive 31 (see Fig. 5). Frame section 27 is provided with a rail engaging friction brake 32 that may be employed to stop movement of the tripper apparatus 11 along the rails 21 when the motor apparatus 30 is deenergized and to hold the tripper apparatus 11 at any position along the main conveyer 10.

The intermediate section 33 of tripper main frame 28 is carried on the rails 21 by two pairs of spaced flanged wheels 34 and this frame section 33 is connected to the head frame section 27 for vertical movement with respect thereto through a tow bar apparatus indicated at 35 in Fig. 2 of the drawings. Tow bar mechanism 35 includes two laterally spaced ears or lugs, one of which is seen at 36, that are attached to the head frame section 27 and between which there extends a single ear or lug 37 that is attached to the intermediate frame section 33. Ears or lugs 36 are provided with aligned vertical slots 38 that receive a bolt or pin that extends through them and the ear or lug 37 to provide for the vertical movement of the frame sections 27 and 33 above referred to, whereby the tripper frame elements may accommodate themselves to any unevenness of the rails 21 along which they ride.

Tail frame section 39 of the tripper main frame 28 includes a pair of spaced side channel members 40 that are interconnected by inverted U-shaped elements 41. One end of each of the spaced side channel members 40 is connected through an ear or lug 42 to one end of the intermediate frame section 33 through a pivot pin 43, and the front end of members 40 and consequently the frame section 39 is carried by a pair of flanged wheels 44 that roll along the rails 21. The pivot pins 43 lie on a common axis that extends transversely of the tripper frame 28 and therefore the tail section is free to pivot with respect to the intermediate frame section 33 as it is towed thereby to accommodate unevenness of the rails 21.

The particular conveyer apparatus illustrated in the drawings is designed for conveying logs and the like and it is intended only to illustrate one embodiment of the invention. In this conveyer apparatus the endless belt conveyer 14 is a flat belt type conveyer, and the idler rollers 22 are straight throughout their lengths, but it is to be understood that the invention may be applied with equal advantage to troughing conveyers wherein the transverse idler rollers, such as the idler rollers 22, form the belt conveyer into a trough.

In tripper conveyer apparatuses of the general type herein shown it has, prior to this invention, been common practice to cause the endless belt conveyer, such as the conveyer 14, to be lifted from the idler rollers 22 by the pulley 24 on the head frame section 27 of the tripper apparatus 11 and to permit the belt conveyer to be unsupported between the idler rollers 22 and the pulley 24. In some instances in the prior art idler rollers have been carried by the tripper main frame to support the endless belt conveyer in a portion of its run between the idler rollers and the discharge pulley, such as the pulley 24, on the tripper apparatus.

This invention employs rollers 45, such as those last referred to, which rollers, as shown in the drawings, are carried by the frame sections 27 and 33 of the tripper apparatus 11 upon suitable longitudinally extending spaced upwardly sloping frame members 46 and 47. The tail section frame 39 of my tripper apparatus 11 includes no belt conveyer supporting idlers of any kind. This frame structure provides a guide means that guides or confines logs and the like that may be or tend to extend over the sides of the belt conveyer 14 as it travels along the main conveyer 10 so that all of the logs will be substantially directly above the belt conveyer where it travels along the tripper apparatus to the discharge pulley 24. For this reason the tail section frame 33 is of rugged construction and it includes numerous bracing and strengthening elements indicated in Fig. 4 of the drawings which are not specifically described herein. It may be pointed out, however, that the tail frame section 33 includes two spaced upright posts or bumpers 48 at the front end of the frame section and one on each side of the belt conveyer 14 that engage any logs and the like projecting laterally from the belt conveyer 14 as they enter between the spaced side members 40 of the frame section 39. These bumpers 48 cause the ends of the logs and the like that project laterally of the belt conveyer 14 to be shoved or pushed onto the belt conveyer.

Tail section frame 39 also includes a pair of spaced upright wall members 49 (see Fig. 6) which extend longitudinally over the belt conveyer 14, one at each side thereof. These upright walls 49 between which the belt conveyer travels function to retain logs and the like properly piled on the belt conveyer as they pass through the tripper frame.

Each of the frame sections 33 and 27 of the tripper main frame 28 is provided with upright side wall members 50 and 51, respectively, which are aligned with the upright wall members 49 of the tail section 39 to form guiding means for logs and the like on the belt conveyer 14 that extend from the chute 26 forwardly throughout substantially the full length of the tripper apparatus 11. As indicated in Fig. 2 of the drawings, the ends of the side wall members 50 and 51 at the adjacent ends of the frame sections 27 and 23 are aligned but spaced slightly from each other and are overlapped by plates, one of which is indicated at 52, in order that the wall members 50 and 51 may partake of any movement of the frame section to which it is mounted as the tripper apparatus 11 travels longitudinally along the rails 21. The spaced side wall members 49 overlap the wall members 50 adjacent the pivot pin 43 through which the tail frame section 39 is pivotally attached to the intermediate frame section 33 (see Fig. 3) and they may pivot with the frame section 39 about the axis of these pins 43.

As indicated in Figs. 3, 5 and 6 of the drawings, the main frame 15 of the main conveyor 10 is also provided with spaced upright side wall members 53 and 54. These side wall members 53 and 54 may be welded along the inner edges of the inverted channel members 20 that support the rails 21 and they preferably extend throughout the length of the main conveyor 15. Walls 53 and 54 have the dual function of guiding logs and the like as they travel along the main conveyer 10 on the working run of the belt conveyer 14 and they function to guide a sledge 55 that supports the endless belt conveyer 14 in its upward travel between the idler rollers 22 on the main conveyor 10 and the idler rollers 45 on the intermediate frame section 33 of the tripper apparatus main frame 28.

It may be stated here that the combination herein described, including the sledge 55 in association with the tripper frame and guide elements as well as the main conveyor 10 and its guide elements, constitute the important features of this invention. The sledge 55 includes a frame 56 which in a plan view is rectangular and which in a side elevational view, such as that shown in Fig. 3 of the drawings, is wedge-shaped; that is, it tapers or slopes upwardly rearwardly from its front to its rear end. It includes spaced side members 57 that provide inwardly turned bottom flanges 58 that ride directly upon the idler rollers 22 of main conveyor 10, and these side members are spaced apart by suitable cross members 59.

As pointed out above, sledge 55 is supported directly by the idler rollers 22 on the main conveyer 10 and adjacent its front end each of its side wall members 57 carries a runner or slide 60 adapted to engage one of the upright side wall elements 53 or 54 of the main conveyer frame 15. By these means the front end of the sledge is maintained centered between the walls 53 and 54 of the main conveyer frame 15.

The rear end of the sledge frame 56 is attached through a flexible tow bar means 61 to the front end of the intermediate frame section 33. This tow bars means 61 is identical to the tow bar means 35, previously described, employed to connect the frame sections 27 and 33. Both of the tow bars or connectors 35 and 61 are located substantially on the longitudinal center or axis of the tripper main frame 15 as indicated in Fig. 4 of the drawings, and the tow bar means 61 will maintain the rear end of the sledge 55 centered between the upright walls 53 and 54 of the main conveyer 10 and on the idler rollers 22. It will be seen that the sledge 55 rides upon the idler rollers 22 and that because its only connection with the tripper main frame 15 is through the tow bar structure 61 it will follow any unevenness in elevation of the idler rollers 22 of main conveyer 10. It will be seen spscifically that the elevation of the sledge 55 may vary with respect to the tripper 11 because of the slotted connections in the tow bar 61 and that it may pivot about the transverse horizontal axis of the connecting pin 62 of the tow bar 61.

The side members 57 of the sledge frame 56 are notched along their upper edges and carry a plurality of idler rollers 63 that extend transversely of the sledge 55 which support the endless conveyer belt 14 from immediately adjacent that point where the endless belt conveyer 14 is raised off of the idler rollers 22 to where it is received on one of the idler rollers 45 on the intermediate frame section 33 of tripper apparatus 11.

From the foregoing description it will be seen that the tripper apparatus 11 may be moved along the main conveyer 10 to discharge logs or the like at any desired point along the length of the main conveyer 10. It will also be seen that substantially the entire section of the working run of the endless conveyer belt 14 is supported between that point where it is elevated from the idler rollers 22 of main conveyer 10 and a supporting roll on the tripper apparatus by the sledge 55 and that therefore most of the weight of the material being conveyed across this portion of the working run of the belt 14 is transferred through the belt conveyer 14 to the sledge 55 and then to the idler rollers 22 of the main conveyor 10. It is obvious that as the tripper apparatus 11 travels along the main conveyer 10 the sledge 55 gently lifts or gently lays the belt 14 from or on the idler rollers 22 rather than depending solely upon the tension of the belt as to prior art structures, and further that the weight of the material being conveyed by the belt conveyer 14 is not supported solely by the tension of the endless belt conveyer 14 between the idler rollers 22 and the conveyer belt supporting means on the tripper frame 28, but that the weight of the material being conveyed across this space is borne to a large degree by the sledge 55.

By this invention, logs and the like are transferred smoothly from the main conveyer 10 to the tripper conveyer 11 and they therefore do not tend to bruise or otherwise damage the belt conveyer 14 when they begin to pass over any of the idler rollers 63 or 45.

It will also be seen that the tripper apparatus includes a frame means, namely, elements 27 and 33, that are adapted to travel longitudinally of the main conveyer main frame 15 and that to the tripper frame means 27 and 33, and more specifically to the element 33, there is attached two trailer means, one of which is the guide frame means 39 and the other of which is the sledge 55. The sledge 55 is positioned to carry the endless belt conveyer 14 as it travels between the upright guide walls 49 of the guide or tail section frame and both of the trailer elements 39 and 55 are carried by the main frame 15 of the main conveyor 10.

While the apparatus 55 has been described and claimed herein as a sledge, it is to be understood that where the term sledge is employed broadly in the claims it is to be interpreted as meaning any device having functions the equivalent of the specific sledge above described.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Conveying apparatus including a conveyer having a main frame, a head pulley and a tail pulley on said main frame, idler roll means on said main frame extending transversely thereof and spaced between said head and tail pulleys, an endless belt conveyer operating over said head and tail pulleys and carried in its working run by said idler rolls, rail means extending longitudinally of said main frame, tripper apparatus including a main frame, means supporting said tripper main frame to travel along said rail means, pulley means on said tripper over which said endless belt conveyer is reeved, idler roll means on said tripper main frame adapted to carry said endless belt conveyer, a sledge carried directly by said transverse idler roll means on said main frame, idler roll means carried by said sledge for supporting said endless belt conveyer between said idler rolls on said first main frame and said idler roll means on said tripper frame, and towing means interconnecting said tripper frame and said sledge providing for both pivotal movement of said sledge about a horizontal axis and elevational movement to different generally horizontal planes.

2. Conveying apparatus including a first main frame, a head pulley and a tail pulley on said main frame, spaced idler rolls on said main frame between said head and tail pulleys, an endless belt conveyer operating over said head and tail pulleys and carried in its working run by said spaced idler rolls, tripper apparatus including a main frame adapted to travel longitudinally above said first main frame and through which said endless conveyer belt travels including pulley means over which said endless belt conveyer is reeved, spaced idler rolls on said tripper main frame adapted to support said endless belt conveyer in its travel between an idler roll on said first main frame and one of said pulleys on said tripper main frame, a sledge carried by said idler rolls on said first frame, towing means loosely attaching said sledge to said tripper main frame whereby said sledge moves along said spaced idler rolls on said first main frame as said tripper moves longitudinally along said first main frame, and spaced idler roll means on said sledge adapted to support said endless belt conveyer between said idler rolls on said first main frame and said idler rolls on said tripper main frame.

3. Conveying apparatus including a first main frame, a head pulley and a tail pulley on said main frame, conveyer belt supporting means on said main frame, between said head and tail pulleys, an endless belt conveyer operating over said head and tail pulleys and carried in its working run by said supporting means, tripper apparatus including a main frame adapted to travel longitudinally above said first main frame and through which said endless conveyer belt travels including pulley means over which said endless belt conveyer is reeved, means on said tripper main frame adapted to support said endless belt conveyer in its travel between said supporting means on said first main frame and one of said pulleys on said tripper main frame, a sledge carried by said supporting means on said first main frame, towing means loosely attaching said sledge to said tripper main frame whereby said sledge moves along said support means on said first frame as said tripper apparatus moves longitudinally along said first main frame, and conveyer belt supporting means on said sledge adapted to support said endless belt conveyer between said support means on said first main frame and on said tripper main frame.

4. Conveying apparatus including a first main frame, conveyer belt supporting belt supporting means on said main frame, an endless belt conveyer carried in its working run by said conveyer belt supporting means, tripper apparatus including a main frame adapted to travel longitudinally above said first main frame and through which said endless belt conveyer travels, support means on said tripper main frame for carrying said endless belt conveyer in its travel through said tripper, a sledge carried directly by said endless belt supporting means on said first main frame, towing means attaching said sledge to said tripper whereby said sledge moves along said support means on said first main frame as said tripper moves longitudinally along said first main frame, and conveyer belt supporting means on said sledge supporting said endless belt conveyer between said endless belt supporting means on said first main frame and the endless belt supporting means on said tripper main frame.

5. Conveying apparatus including a first main frame, conveyer belt supporting means on said main frame, an endless belt conveyer carried in its working run by said conveyer belt supporting means, bodily movable apparatus including a main frame adapted to travel longitudinally above said first main frame and over which said endless belt conveyer travels, support means on said bodily movable apparatus main frame for carrying said endless belt conveyer in its travel over said bodily movable apparatus, a sledge carried directly by said endless belt supporting means on said first main frame, towing means attaching said sledge to said bodily movable apparatus whereby said sledge moves along said support means on said first main frame as said bodily movable apparatus moves longitudinally along said first main frame, and conveyer belt supporting means on said sledge supporting said endless belt conveyer between said endless belt supporting means on said first main frame and the endless belt supporting means on said bodily movable apparatus main frame.

6. Conveyer apparatus including a frame adapted to travel longitudinally above a main conveyer apparatus that includes conveyer belt idler roller supporting means, said frame having means thereon adapted to carry an endless belt conveyer that travels over the endless belt idler roller supporting means of said main conveyer, sledge means adapted to be carried directly by said endless belt idler roller supporting means of said main conveyer apparatus for supporting said endless belt between the supporting means of said main conveyer apparatus and the belt supporting means on said frame, and means interconnecting said frame and said sledge providing for both pivotal movement of said sledge about a horizontal axis and elevational movement to different generally horizontal planes.

7. Conveying apparatus including a main conveyer having a main frame, a head pulley and a tail pulley, an endless belt conveyer operating over said head and tail pulleys, means on said main frame for supporting said endless belt conveyer in its working run between said head and tail pulleys, tripper apparatus adapted to travel longitudinally of said main frame including frame means, guide means for guiding material being conveyed by said belt conveyer as it enters and travels over said tripper frame means including a frame, means pivotally attaching said guide frame to said tripper frame means whereby said guide frame follows said tripper frame means as a trailer, a sledge means carried directly by said belt conveyer supporting means on said main conveyer main frame and positioned to support said endless belt as it travels in said guide frame, and towing means interconnecting said tripper frame means and said sledge whereby said sledge also follows said tripper frame means as a trailer.

8. Conveying apparatus including a main conveyer having a main frame, a head pulley and a tail pulley, an endless belt conveyer operating over said head and tail pulleys, means on said main frame for supporting said endless belt conveyer in its working run between said head and tail pulleys, tripper apparatus adapted to travel longitudinally of said main frame including frame means having guide means for guiding material being conveyed by said belt conveyer as it enters and travels over said tripper frame means, a sledge means carried directly by said belt conveyer supporting means on said main conveyer main frame and positioned to support said endless belt as it travels in said tripper frame means, and towing means interconnecting said tripper frame means and said sledge whereby said sledge follows said tripper frame means as a trailer.

9. Conveyer tripper apparatus adapted to travel longitudinally along the frame of an endless main belt conveyer, said tripper apparatus including frame means, guide means for guiding material being conveyed by said belt conveyer as it enters and travels over said tripper frame means including a frame, means pivotally attaching said guide frame to said tripper frame means whereby said guide frame follows said tripper frame means as a trailer, a sledge means adapted to be carried by said main belt conveyer frame means and positioned to support said endless belt conveyer as it travels in said guide frame, and towing means interconnecting said tripper frame means and said sledge whereby said sledge also follows said tripper frame means as a trailer.

10. Conveyer tripper apparatus adapted to travel longitudinally along the frame of an endless main belt conveyer, said tripper apparatus including frame means having guide means for guiding material being conveyed by said belt conveyer as it enters and travels over said tripper frame means, a sledge means adapted to be carried by said main belt conveyer frame means and positioned to support said endless belt conveyer as it travels in said tripper frame means, and towing means interconnecting said tripper frame means and said sledge whereby said sledge follows said tripper frame means as a trailer.

11. Conveyer apparatus including a frame adapted to travel longitudinally above a main conveyer apparatus that includes conveyer belt idler roller supporting means, said frame having means thereon adapted to carry an endless belt conveyer that travels over the endless belt idler roller supporting means of said main conveyer, sledge means adapted to be carried directly by said endless belt idler roller supporting means of said main conveyer apparatus for supporting said endless belt between the supporting means of said main conveyer apparatus and the belt supporting means on said frame, and means interconnecting said frame and said sledge providing for pivotal movement of said sledge about a horizontal axis.

12. Conveyer apparatus including a frame adapted to travel longitudinally above a main conveyer apparatus that includes conveyer belt idler roller supporting means, said frame having means thereon adapted to carry an endless belt conveyer that travels over the endless belt idler roller supporting means of said main conveyer, sledge means adapted to be carried directly by said endless belt idler roller supporting means of said main conveyer apparatus for supporting said endless belt between the supporting means of said main conveyor apparatus and the belt supporting means on said frame, and means interconnecting said frame and said sledge.

References Cited in the file of this patent

FOREIGN PATENTS 516,058    Germany  ---------------  Jan. 17, 1931